United States Patent
Farrell et al.

(10) Patent No.: US 9,771,082 B2
(45) Date of Patent: Sep. 26, 2017

(54) REDUCING COGNITIVE DEMAND ON A VEHICLE OPERATOR BY GENERATING PASSENGER STIMULUS

(71) Applicant: International Business Machines Corporation, Armonk, NY (US)

(72) Inventors: Robert G. Farrell, Cornwall, NY (US); Dimitri Kanevsky, Ossining, NY (US); Tara N. Sainath, Jersey City, NJ (US)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 14/825,697

(22) Filed: Aug. 13, 2015

(65) Prior Publication Data

US 2017/0043782 A1    Feb. 16, 2017

(51) Int. Cl.
*B60W 40/09*    (2012.01)
*B60W 40/08*    (2012.01)

(52) U.S. Cl.
CPC ..... *B60W 40/08* (2013.01); *B60W 2040/0881* (2013.01); *B60W 2540/22* (2013.01)

(58) Field of Classification Search
CPC combination set(s) only.
See application file for complete search history.

(56) References Cited

U.S. PATENT DOCUMENTS

| | | | |
|---|---|---|---|
| 6,917,306 B2 * | 7/2005 | Lilja | G08G 1/0965 340/436 |
| 6,974,414 B2 | 12/2005 | Victor | |
| 7,042,340 B2 * | 5/2006 | Ewert | B60Q 5/00 116/22 A |
| 7,097,226 B2 * | 8/2006 | Bingle | E05B 83/26 296/76 |
| 7,835,834 B2 | 11/2010 | Smith et al. | |
| 7,924,146 B2 * | 4/2011 | Seder | G01S 13/723 340/435 |
| 8,044,782 B2 * | 10/2011 | Saban | B60N 2/002 340/438 |
| 8,384,555 B2 | 2/2013 | Rosen | |

(Continued)

OTHER PUBLICATIONS

F.J. Pompei et al., "An Automobile-Integrated System for Assessing and Reacting to Driver Cognitive Load," Society of Automotive Engineers, Report No. SAE Document 2002-21-0061; CSA Technology Research Database, Oct. 2002, 6 pages.

(Continued)

*Primary Examiner* — Jonathan L Sample
(74) *Attorney, Agent, or Firm* — Kurt Goudy; Ryan, Mason & Lewis, LLP

(57) ABSTRACT

A method for reducing cognitive demand on a vehicle operator comprises detecting one or more passengers in a vehicle in addition to the vehicle operator, determining an acceptable level of cognitive demand on the vehicle operator corresponding to an operating environment, determining an existing level of cognitive demand on the vehicle operator in the operating environment, determining whether the existing level of cognitive demand is greater than the acceptable level of cognitive demand, and wherein, if the existing level of cognitive demand is greater than the acceptable level of cognitive demand, generating a stimulus directed to the one or more passengers in order to reduce the existing level of cognitive demand on the vehicle operator.

20 Claims, 6 Drawing Sheets

(56) References Cited

U.S. PATENT DOCUMENTS

| | | | | |
|---|---|---|---|---|
| 8,600,587 | B1* | 12/2013 | Seah | G08G 5/0091 |
| | | | | 701/10 |
| 8,706,143 | B1 | 4/2014 | Elias | |
| 8,842,004 | B2* | 9/2014 | Kabler | G01S 7/022 |
| | | | | 340/539.11 |
| 8,874,301 | B1* | 10/2014 | Rao | G05D 1/0061 |
| | | | | 180/272 |
| 2002/0041692 | A1* | 4/2002 | Seto | G06F 17/30017 |
| | | | | 381/86 |
| 2004/0252027 | A1* | 12/2004 | Torkkola | G08B 21/06 |
| | | | | 340/576 |
| 2005/0256635 | A1* | 11/2005 | Gardner | G01C 21/26 |
| | | | | 701/431 |
| 2006/0259206 | A1* | 11/2006 | Smith | A61B 3/113 |
| | | | | 701/1 |
| 2007/0219672 | A1* | 9/2007 | Fehr | B60W 40/08 |
| | | | | 701/1 |
| 2010/0033313 | A1* | 2/2010 | Keady | G08G 1/0965 |
| | | | | 340/438 |
| 2010/0049393 | A1 | 2/2010 | Emam et al. | |
| 2010/0253492 | A1* | 10/2010 | Seder | G01S 13/723 |
| | | | | 340/435 |
| 2011/0150233 | A1 | 6/2011 | Gautama | |
| 2011/0210867 | A1* | 9/2011 | Benedikt | G08G 1/01 |
| | | | | 340/905 |
| 2012/0030708 | A1 | 2/2012 | Margis et al. | |
| 2012/0089442 | A1* | 4/2012 | Olsson | G06Q 30/0207 |
| | | | | 705/14.1 |
| 2012/0114130 | A1 | 5/2012 | Lovitt | |
| 2012/0232749 | A1* | 9/2012 | Schoenberg | B60N 2/002 |
| | | | | 701/36 |
| 2012/0235819 | A1 | 9/2012 | Watkins et al. | |
| 2012/0252350 | A1 | 10/2012 | Steinmetz et al. | |
| 2012/0264409 | A1 | 10/2012 | Geyer et al. | |
| 2012/0271484 | A1* | 10/2012 | Feit | B60W 30/09 |
| | | | | 701/1 |
| 2013/0009760 | A1* | 1/2013 | Washlow | G01S 7/003 |
| | | | | 340/425.5 |
| 2013/0099908 | A1* | 4/2013 | Salomonsson | B60R 21/0134 |
| | | | | 340/425.5 |
| 2013/0116859 | A1* | 5/2013 | Ihlenburg | G06F 17/00 |
| | | | | 701/2 |
| 2013/0144657 | A1* | 6/2013 | Ricci | G06F 9/54 |
| | | | | 705/4 |
| 2013/0297463 | A1* | 11/2013 | Garber | G06Q 10/087 |
| | | | | 705/28 |
| 2014/0135598 | A1* | 5/2014 | Weidl | A61B 5/6893 |
| | | | | 600/301 |
| 2015/0160019 | A1* | 6/2015 | Biswal | G01C 21/26 |
| | | | | 701/1 |
| 2015/0179062 | A1* | 6/2015 | Ralston | G01C 21/26 |
| | | | | 701/117 |
| 2015/0229341 | A1* | 8/2015 | Fung | H04B 1/10 |
| | | | | 702/191 |
| 2015/0266377 | A1* | 9/2015 | Hampiholi | B60K 35/00 |
| | | | | 455/466 |
| 2016/0086285 | A1* | 3/2016 | Jordan Peters | G06Q 40/08 |
| | | | | 705/4 |
| 2016/0117947 | A1* | 4/2016 | Misu | G09B 9/04 |
| | | | | 434/62 |
| 2016/0146618 | A1* | 5/2016 | Caveney | G05D 1/06 |
| | | | | 701/25 |
| 2016/0236690 | A1* | 8/2016 | Juneja | G06F 3/16 |
| | | | | |
| 2016/0377447 | A1* | 12/2016 | DeLuca | G08G 1/096838 |
| | | | | 701/400 |

OTHER PUBLICATIONS

Anonymous, "Monitor Emotional Intensity Level of Conversation While Driving," IP.com No. IPCOM000222317D, Sep. 2012, 4 pages.

H. Fu et al., "The Effect of Passenger Age and Gender on Young Driver Crash Risks," Transportation Research Board Annual Meeting (TRB), TRB Paper No. 08-0617, Nov. 2007, 19 pages.

J. Son et al., "Impact of Traffic Environment and Cognitive Workload on Older Drivers' Behavior in Simulated Driving," International Journal of Precision Engineering and Manufacturing, Feb. 2011, pp. 135-141, vol. 12, No. 1.

D.L. Strayer et al., "Measuring Cognitive Distraction in the Automobile," AAA Foundation for Traffic Safety, Jun. 2013, 53 pages.

C. Ohm et al., "Estimating the Driver's Workload: Using Smartphone Data to Adapt In-Vehicle Information Systems," Advances in Artificial Intelligence, 36th Annual German Conference on Artificial Intelligence, Lecture Notes in Computer Science, Sep. 2013, pp. 130-139, vol. 8077.

Lisbeth Harms, "Variation in Drivers' Cognitive Load. Effects of Driving Through Village Areas and Rural Junctions," Ergonomics, Feb. 1991, pp. 151-160, vol. 34, No. 2.

J.M. Boden et al., "Repressive Coping: Distraction Using Pleasant Thoughts and Memories," Journal of Personality and Social Psychology, Jul. 1997, pp. 45-62, vol. 73, No. 1.

L.-H. Chen et al., "Carrying Passengers as a Risk Factor for Crashes Fatal to 16- and 17-Year-Old Drivers," The Journal of the American Medical Association (JAMA), Mar. 2000, pp. 1578-1582, vol. 283, No. 12.

D.R. Durbin et al., "Driving Errors of Learner Teens: Frequency, Nature and Their Association with Practice," Accident Analysis and Prevention, Aug. 2014, pp. 433-439, vol. 72C.

Fleetmatics, "Welcome to the Whole Picture with Driver ID: a Look into Fleetmatics Reveal Driver Management Software," http://www.fleetmatics.com/reveal/driver-management-software, 2015, 3 pages.

John M. Grohol, Psy.D., "What is Functional Near-Infrared Spectroscopy?," PsychCentral, http://psychcentral.com/lib/what-is-functional-optical-brain-imaging/, Jan. 2013, 9 pages.

A.E. Curry et al., "Peer Passengers: How Do They Affect Teen Crashes?" The Journal of Adolescent Health, Jun. 2012, pp. 588-594, vol. 50, No. 6.

* cited by examiner

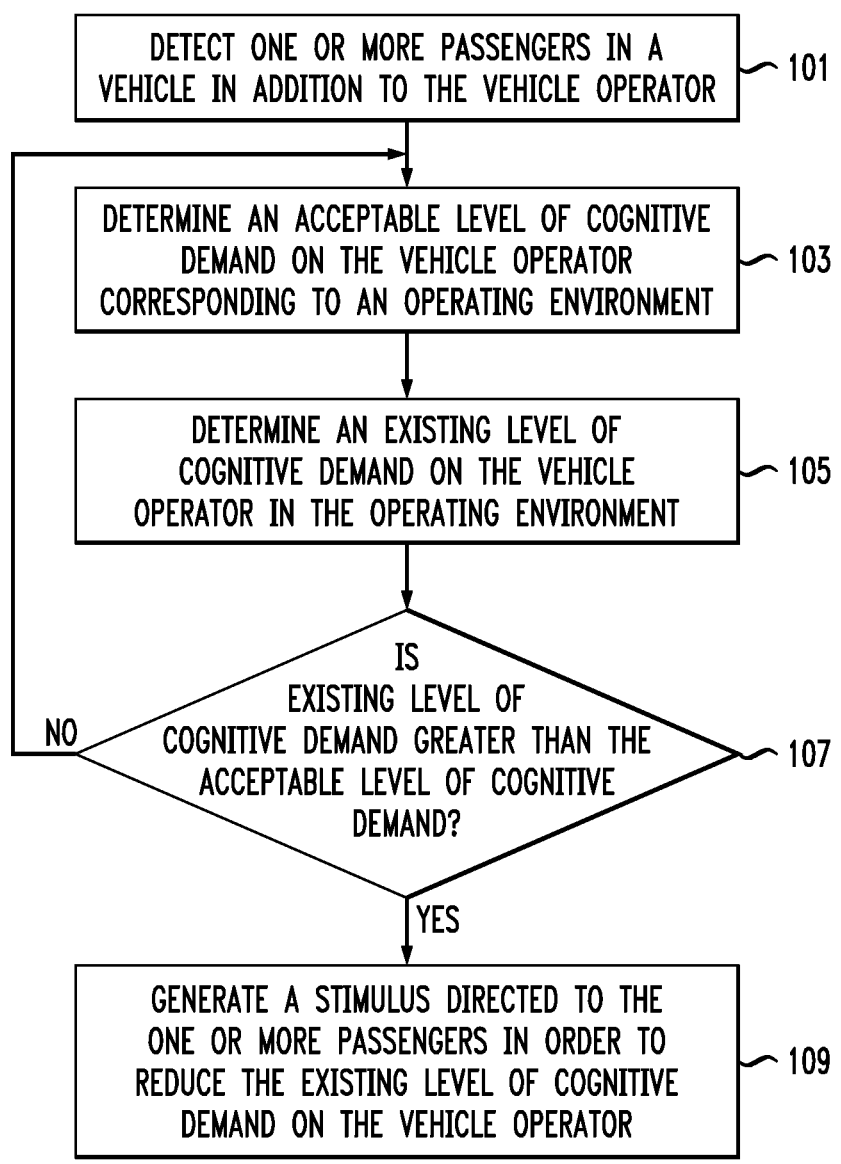

FIG. 2

OPERATOR AND PASSENGER DATA

| USER ID | ROLE THIS TRIP | GENDER | YEARS OF OPERATING EXPERIENCE | AGE CLASS |
|---------|----------------|--------|-------------------------------|-----------|
| 1 | OPERATOR | FEMALE | 2 | TEEN |
| 2 | PASSENGER | MALE | 1 | TEEN |
| 3 | PASSENGER | MALE | 20 | ADULT |

FIG. 3

OPERATING ENVIRONMENT DATA

| ROAD CONDITIONS | WEATHER CONDITIONS | TRAFFIC CONDITIONS |
|-----------------|--------------------|--------------------|
| NORMAL | RAINY | LIGHT |
| ROUGH | SNOWY | HEAVY |

FIG. 4

VEHICLE DATA

| VEHICLE ID | MAKE AND MODEL | LOCATION | RADIO VOLUME |
|------------|----------------|----------|--------------|
| 98458791023 349851 | HONDA CIVIC | N41 26.65307 W74 1.23773 | 9 |

FIG. 5
PASSENGER PROGRAM PREFERENCES

| PASSENGER ID | MUSIC GENRE | VIDEO GENRE | GAME GENRE |
|---|---|---|---|
| 2 | ROCK | DOCUMENTARY | SHOOTER |
| 3 | COUNTRY | WESTERN | RACING |

FIG. 6
PROGRAMMED ACTIVITIES

| PROGRAM ID | FUNCTION | TYPE | GENRE | LENGTH | FILE | TARGET | COGNITIVE LOAD RATING |
|---|---|---|---|---|---|---|---|
| 1 | ENGAGE | MUSIC | ROCK | 5 MIN | 1011010 1010100 1010 | TEEN, MALE | 3 |
| 2 | ENGAGE | VIDEO | MYSTERY | 30 MIN | 1010010 1010101 010 | TEEN | 2 |
| 3 | GET ATTENTION | VIBRATION | MORSE CODE | 5 SEC | 1001010 10101 | ANY | 0 |

REDUCING COGNITIVE DEMAND ON A VEHICLE OPERATOR BY GENERATING PASSENGER STIMULUS

TECHNICAL FIELD

The field generally relates to the reduction of cognitive demand on an operator of a vehicle and, in particular, to reducing cognitive demand on a vehicle operator by generating a stimulus directed to one or more passengers.

BACKGROUND

More vehicle accidents may occur when drivers have high cognitive demands from various aspects of a driving environment, such as, for example, poor road conditions and visibility. More accidents can also occur when drivers are distracted by passengers. The latter can be particularly true in connection with younger and/or inexperienced drivers, such as teenagers. Passengers distracting a driver can lead to accidents that result in damage, financial loss, injuries, and even death.

Accordingly, there is need for systems and/or methods that can reduce distraction from passengers, especially in situations where high cognitive demand from drivers is required.

SUMMARY OF THE INVENTION

In general, exemplary embodiments of the invention relate to reducing cognitive demand on a vehicle operator by generating a stimulus that will engage one or more passengers and prevent the passengers from distracting the operator of the vehicle.

According to an exemplary embodiment of the present invention, a method for reducing cognitive demand on a vehicle operator comprises detecting one or more passengers in a vehicle in addition to the vehicle operator, determining an acceptable level of cognitive demand on the vehicle operator corresponding to an operating environment, determining an existing level of cognitive demand on the vehicle operator in the operating environment, wherein the existing level of cognitive demand is attributable at least in part to an activity of the one or more passengers, determining whether the existing level of cognitive demand is greater than the acceptable level of cognitive demand, and wherein, if the existing level of cognitive demand is greater than the acceptable level of cognitive demand, generating a stimulus directed to the one or more passengers in order to reduce the existing level of cognitive demand on the vehicle operator.

According to an exemplary embodiment of the present invention, a system for reducing cognitive demand on a vehicle operator, comprises a memory and at least one processor coupled to the memory, one or more sensors, executed via the at least one processor, capable of detecting one or more passengers in a vehicle in addition to the vehicle operator, and an engagement component, executed via the at least one processor and operatively coupled to the one or more sensors, wherein the engagement component is capable of determining an acceptable level of cognitive demand on the vehicle operator corresponding to an operating environment, determining an existing level of cognitive demand on the vehicle operator in the operating environment, wherein the existing level of cognitive demand is attributable at least in part to an activity of the one or more passengers, determining whether the existing level of cognitive demand is greater than the acceptable level of cognitive demand, and generating a stimulus directed to the one or more passengers in order to reduce the existing level of cognitive demand on the vehicle operator, if the existing level of cognitive demand is greater than the acceptable level of cognitive demand.

According to an exemplary embodiment of the present invention, a computer program product for reducing cognitive demand on a vehicle operator, comprises a computer readable storage medium having program instructions embodied therewith, the program instructions executable by a processor to cause the processor to perform a method comprising detecting one or more passengers in a vehicle in addition to the vehicle operator, determining an acceptable level of cognitive demand on the vehicle operator corresponding to an operating environment, determining an existing level of cognitive demand on the vehicle operator in the operating environment, wherein the existing level of cognitive demand is attributable at least in part to an activity of the one or more passengers, determining whether the existing level of cognitive demand is greater than the acceptable level of cognitive demand, and wherein, if the existing level of cognitive demand is greater than the acceptable level of cognitive demand, generating a stimulus directed to the one or more passengers in order to reduce the existing level of cognitive demand on the vehicle operator.

These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which:

FIG. 1 is a flow diagram of a process for reducing cognitive demand on a vehicle operator, according to an exemplary embodiment of the invention.

FIG. 2 is a chart illustrating operator and passenger data which may be used in connection with determining the acceptable and existing levels of cognitive demand on a vehicle operator, according to an exemplary embodiment of the invention.

FIG. 3 is a chart illustrating different types of operating conditions that may contribute to a determination of the acceptable and existing levels of cognitive demand on a vehicle operator, according to an exemplary embodiment of the invention.

FIG. 4 is a chart illustrating vehicle data which may be used in connection with determining the acceptable and existing levels of cognitive demand on a vehicle operator, according to an exemplary embodiment of the invention.

FIG. 5 is a chart illustrating passenger program preferences, according to an exemplary embodiment of the invention.

FIG. 6 is a chart illustrating details of different types of stimuli, according to an exemplary embodiment of the invention.

DETAILED DESCRIPTION OF EXEMPLARY EMBODIMENTS

Figure 7:
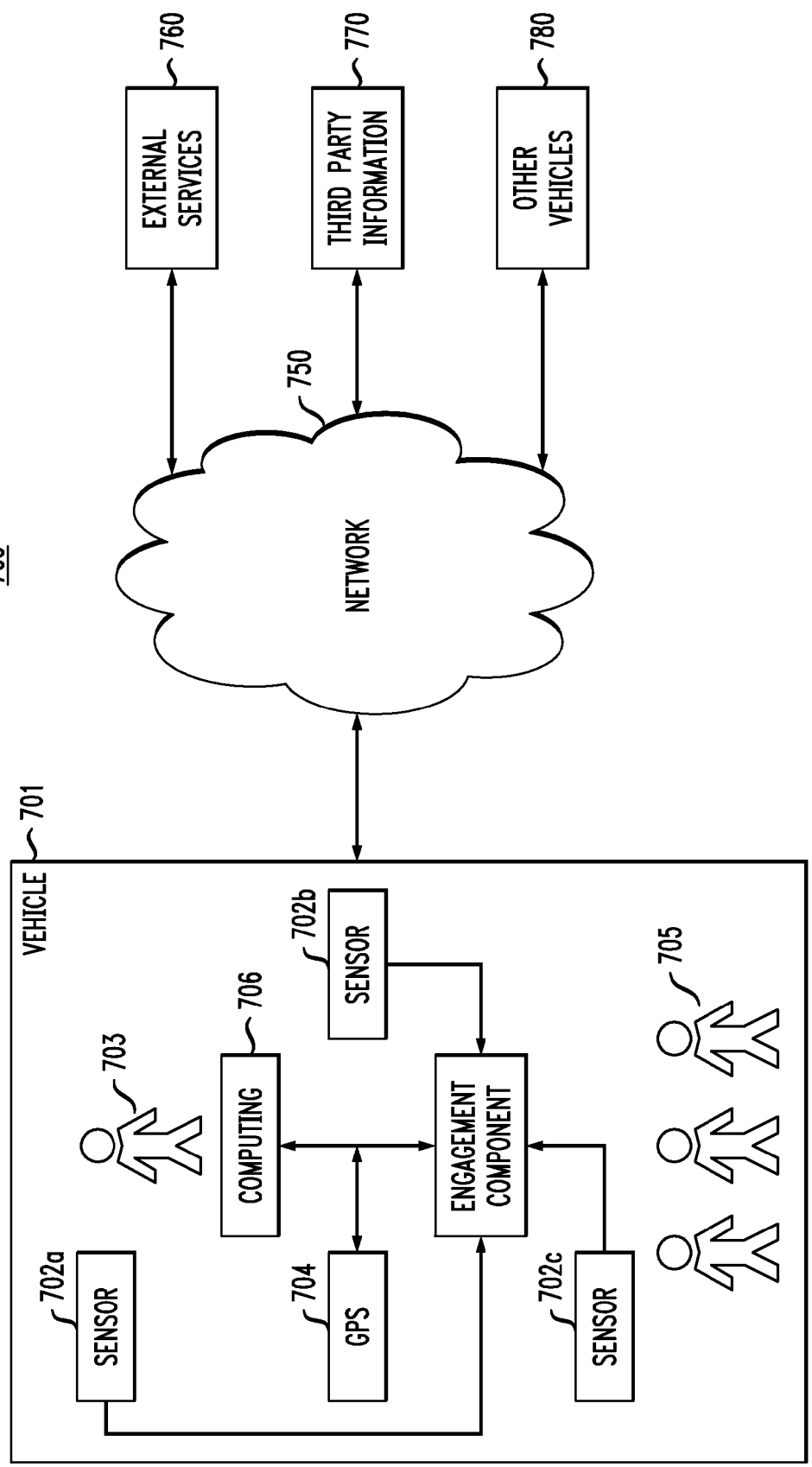
FIG. 7 is a block diagram of a system for reducing cognitive demand on a vehicle operator, according to an exemplary embodiment of the present invention.

Exemplary embodiments of the invention will now be discussed in further detail with regard to the reduction of cognitive demand on a vehicle operator by generating a stimulus capable of sufficiently engaging one or more passengers in order to prevent the passengers from dangerously distracting the operator of the vehicle. This invention may, however, be embodied in many different forms and should not be construed as limited to the embodiments set forth herein.

As used herein, a "vehicle" can refer to a mode of transportation, including but not limited to a car, sport utility vehicle (SUV), truck, bus, motorcycle, train, airplane, helicopter, and a boat.

As used herein, a "vehicle operator" can refer to an individual that operates and/or controls a vehicle, including, but not limited to, a driver, a pilot, a co-pilot, an engineer, and a helmsman. Multiple operators (e.g., a pilot and co-pilot) can be treated as one operator, or individually according to embodiments of the present invention.

As used herein, a "cognitive demand" or "cognitive load" can refer to an amount of mental effort in being used and/or required in the working memory of an individual.

As used herein, a "level of cognitive demand" or "level of cognitive load" can refer to a value of cognitive demand or value of cognitive load. The value can be, for example, a numerical value in a given range or scale indicating lower to higher levels, and determined, using, for example, regression modeling and learning algorithms. The value for cognitive load or cognitive demand can be based on behavioral scales (e.g., ongoing tasks such as talking on a mobile phone), physiological measurements, including, but not limited to, vital sign, neurological, and ocular measurements, and/or environmental stimuli, including, but not limited to, environmental stimuli inside the vehicle, such as from a radio or a passenger, and/or outside the vehicle, such as weather, traffic or road conditions. Normalized scales that provide a multiplier are available from known studies. For example, on the low end, there can be the single task of driving (multiplier=1.0) and on the high end there can be a highly distracting task, such as, for example, performing simultaneous math and memorization while driving (multiplier=5 times the cognitive load of just driving). Other tasks may include, but are not limited to, playing a radio (multiplier=1.21), and talking on a hand-held mobile phone (multiplier=2.45). These multiplicative factors have been obtained from various studies where measurements of driving performance or distraction in the presence of stimuli have been taken.

The presence of a sound system playing, such as a radio playing, can be detected by, for example, a decibel meter on a mobile device, a device embedded in the vehicle, vehicle electronics (e.g., determining whether a sound system is on or off), or other means. The cognitive load from mobile phone use while driving has been studied extensively, and while there is some disagreement about the level of distraction, it has been determined to be relatively significant with multipliers in excess of 2 (e.g., 2.33 and 2.45). Mobile device use, such as mobile phone use, in a vehicle can be determined, for example, by tracking the mobile device signal, using global positioning system (GPS) techniques, and/or using a mobile device camera scene and motion analyzers.

The operating conditions can be classified as, for example, light, medium, or heavy traffic (e.g., as reflected on map systems using GPS) for a time period (e.g., 5 minutes) ahead on a current route. The speed of a vehicle, as determined by, for example, vehicle electronics, GPS, or other sensors, can also be used to compute a normalized cognitive load factor.

The cognitive load can be thus estimated by multiplying normalized factors for various conditions, including, but not limited to, a playing sound system, mobile device use, traffic, weather and road conditions and speed.

In accordance with an embodiment of the present invention, stimuli is generated by running programmed activities on an engagement device within a vehicle to generate a cognitive load on passengers in the vehicle. There can be one or more engagement devices in a vehicle. For example, a single engagement device can be shared by passengers, or each passenger can have their own engagement device or some combination of personal and shared devices. According to an embodiment, the engagement device and the passengers are located together in a compartment insulated from the operator. The engagement device is a computing device with certain outputs, like audio, video and physical outputs. For example, an engagement device can include a screen to display images and video, speakers to output sound and transducers to produce physical feedback, such as vibrations. In accordance with an embodiment of the present invention, each of these outputs are isolated from the operator so as not to distract the operator. For example, the engagement device may be insulated from the operator by being mounted on the back of an operator's seat, in a passenger compartment or located in the hands of a passenger. The engagement devices could also be mobile devices, such as mobile phones or tablets. A passenger can have earphones operatively coupled to the ED, a directional video display or other means of insulating the operator from the stimulus.

The programmed activities are designed to grab and hold the attention of the passengers, and can be run only as needed, for example, when passengers need to be prevented from distracting a vehicle operator due to harsh conditions and/or operator inexperience. Demanding driving conditions, such as, for example, increased traffic, poor visibility, adverse weather, such as, for example, rain, snow, or fog, and poor and/or challenging road conditions, can require increased attention of a vehicle operator. Passenger behavior can distract the vehicle operator's attention from the driving conditions. In demanding driving situations, the embodiments of the present invention aim to eliminate or reduce the vehicle operator's cognitive load corresponding to the passengers. As a result, the vehicle operator's cognitive load can be maintained at a level which the vehicle operator needs and can handle given the current driving conditions.

In accordance with an embodiment of the present invention, a system is capable of estimating an acceptable level of cognitive demand for a given vehicle operator using data, including but not limited to, road conditions, traffic, and weather, as well as profile information of the vehicle operator, including, but not limited to, the operator's age, violation and/or accident history, and years of operating experience. Historical information for an operator based on, for example, past violations and/or accidents, and the conditions surrounding the past violations and/or accidents can be used to determine a present risk of accidents and/or incidents for a particular vehicle operator. The embodiments of the present invention can determine an individualized acceptable level of cognitive demand based on a given operator's capabilities and a given driving environment. In other words, the embodiments of the present invention can determine a manageable level of cognitive demand for an operator taking into consideration the driving conditions and the operator's abilities. For example, an older and more experienced operator can be perceived to be capable of handling more distraction than a younger and less experienced operator, thus a relatively higher acceptable or manageable level of cognitive demand will be concluded for an older and more experienced operator. More difficult driving conditions will cause an operator to be able to tolerate less distraction, thus a relatively lower acceptable or manageable level of cognitive demand will be concluded under more difficult driving conditions. The operator's capabilities can be based upon, for example, miles driven, time at sea, hours flown, number of years of experience, and/or other measures. Miles driven can be determined by, for example, an odometer (assuming a primary driver). Various technologies exist to identify an operator, (e.g., having unique key fobs for each operator), and thus associate the number of miles driven, time at sea, hours flown, and/or years of experience with the particular operator. In addition, gender and a match between genders in a vehicle, such as a young male operator in a vehicle with other young males, may be concluded as causing more distraction to an operator, resulting in a relatively lower acceptable or manageable level of cognitive demand.

In addition to computing an acceptable level of cognitive demand for a given vehicle operator under certain operating conditions, according to an embodiment of the present invention, the system is also capable of determining an existing level of cognitive demand on the vehicle operator as the vehicle is operated in a current operating environment. As discussed in further detail herein, determining an existing level of cognitive demand on a vehicle operator may comprise sensing a characteristic of or in the vehicle, gathering data using one or more sources external to the vehicle and computing the existing level of cognitive demand based on the sensed characteristic, the gathered data and/or inputted data. According to an embodiment, determining an existing level of cognitive demand on a vehicle operator can also comprise measuring a brain activity level of the vehicle operator, and converting the measured brain activity level into the existing level of cognitive demand on the vehicle operator.

The system is further capable of determining whether the existing level of cognitive demand is greater than the acceptable level of cognitive demand, and if the existing level of cognitive demand is greater than the acceptable level of cognitive demand, a stimulus directed to the one or more passengers is generated in order to reduce the existing level of cognitive demand on the vehicle operator. For example, the existing level of cognitive demand on the vehicle operator is reduced to at least the acceptable level or below the acceptable level.

An existing level of cognitive demand can be characterized as underload, overload, or optimal. For example, an existing level of cognitive demand that is higher than an acceptable level of cognitive demand is characterized as overload, an existing level of cognitive demand that is lower than an acceptable level of cognitive demand is characterized as underload, and an existing level of cognitive demand that is equal to an acceptable level of cognitive demand is characterized as optimal. According to an embodiment, overload can be measured by measuring small errors in driving performance that can then lead to larger errors. Errors can be characterized by level of criticality/severity. In general, it has been determined that teens make more of these errors than adults. A weighted scale of severity can be used that is tuned to types of errors that can be detected using, for example, vehicle electronics and sensors. The number of normalized errors in a fixed period of time (e.g., 5 minutes) can be used. Initially the threshold may be set to only a single minor error.

To determine if there is overload even prior to errors, the same normalized factors can be used as those used for measuring cognitive load. A regression model or classifier (e.g., support vector machine, Bayesian network, neural network) can be used to learn which factors are associated with error using historical data. For example, traffic conditions may be strongly correlated with errors, but noise in the cabin may be weakly correlated. Given a multiple regression equation, a prediction for an error (e.g., major or minor) can be provided during a given 5 minute period, given the presence of the various factors. A cutoff value (e.g., p=0.5) can be set for the probability of error. Thus, by way of example, if in the next 5 minutes the probability of an error is 0.5 or greater due to the various correlated factors, then the level of cognitive demand can be considered unacceptable.

The stimulus can comprise a cognitive load on one or more passengers that is generated by grabbing the passengers' attention by, for example, an audio message, such as calling their names, displaying attention-grabbing photos, playing a tone, or a combination thereof. The stimulus can also maintain the passengers' attention with an activity, such as, for example, providing video entertainment (e.g., movie) or giving the passengers a task, like homework, and increase the cognitive demands of that activity by, for example, playing more intense portions of a video selection, or, in connection with tasks, providing the passengers with more difficult problems to solve. The entertainment may be loaded so as to be age-appropriate, such as cartoons for small children or games for teens.

According to an embodiment, the ability for the stimulus to activate is automatic. Alternatively, the ability for the stimulus to activate is in control of a person (e.g., operator, passengers (e.g., certain passengers, like an adult and/or parent), or a combination thereof). According to an embodiment the operator may be in control because it may be desirable for one or more passengers to be available to help the driver in high load situations. However, if the passengers are in an isolated cabin of the vehicle, such as, for example, the back of an airplane or the back of a taxi cab, or other relatively isolated cabin, then one or more passengers may have control to activate a stimulus if an error is measured.

FIG. 1 is a flow diagram of a process for reducing cognitive demand on a vehicle operator, according to an exemplary embodiment of the invention. Referring to FIG. 1, the process 100 includes, at block 101, detecting one or more passengers in a vehicle in addition to the vehicle operator. Detection of the one or more passengers can be performed by, for example, one or more sensors to detect weight on passenger seats in a vehicle, a facial recognition device, such as, for example, a camera, to identify the presence and/or identity of the one or more passengers, and/or driver input, for example on a dashboard computer, indicating the presence of passengers, which can include their identities. The system may also be capable of matching detected weights and facial recognition data with passenger identities by, for example, reference to a database. Passengers may also be able to affirmatively indicate their presence in the vehicle by inputting their identity or indicating that they are present through a device in the vehicle, such as the ED. For example, a passenger can be permitted to optionally select their name via a user-interface to self-identify. Microphones can also be used to detect sound from passenger conversation, and motion sensors within the vehicle can also be used to determine the presence of one or more passengers.

The process 100 further includes, at block 103, determining an acceptable level of cognitive demand on the vehicle operator corresponding to an operating environment. Determining the acceptable level of cognitive demand on the vehicle operator can comprise computing the acceptable level of cognitive demand based on, for example, profile data of the vehicle operator and/or a condition of the operating environment. The profile data of the vehicle operator comprises, for example, an age, a gender, historical operating data, and/or a number of years of operating experience of the vehicle operator. A condition of the operating environment comprises, for example, a traffic condition, a road condition and/or a weather condition. External services, such as, for example, departments of transportation, the National Weather Service, and/or mapping services, such as Google® Maps, available from Google, Inc. of Mountain View, Calif., can be accessed to detect traffic, poor roads, and weather on a given route at a particular time. The external services could be subscription-based, and may be available via a GPS device, mobile smartphone, or other devices in a vehicle.

According to an embodiment, an acceptable level of cognitive demand on a vehicle operator corresponding to an operating environment can be a default or set value, which may be based on, for example, a number of years of operating (e.g., driving) experience. The number of years of operating experience can be, for example, inferred from the age of the driver, or provided by a user of the system or a third party, such as an insurance company.

The process 100 further includes, at block 105, determining an existing level of cognitive demand on the vehicle operator in the operating environment, wherein the existing level of cognitive demand is attributable at least in part to an activity of the one or more passengers. As noted above, determining an existing level of cognitive demand on a vehicle operator can comprise sensing a characteristic of or in the vehicle, gathering data using one or more sources external to the vehicle and computing the existing level of cognitive demand based on the sensed characteristic, the gathered data and/or inputted data, as well as measuring a brain activity level of the vehicle operator, and converting the measured brain activity level into the existing level of cognitive demand on the vehicle operator.

A sensed characteristic includes, but is not limited to, a speed of the vehicle, a direction of the vehicle, a location of the vehicle, a number of the one or more passengers in the vehicle, a volume level of audio playing in the vehicle, and/or the activity of the one or more passengers in the vehicle. The characteristics can be sensed by, for example, one or more sensors appropriately located in or on different portions of the vehicle.

The activity of the one or more passengers can include a distracting activity to the vehicle operator, such as, for example, the one or more passengers making noise, talking toward the vehicle operator, talking to other passengers, talking on a mobile phone, waving their hands, and/or moving around in a seat. Sensors, such as, for example, one or more microphones, cameras and pressure sensors in seats, can detect these distracting activities. A sensor, such as a decibel meter can also be used to detect volume levels of audio, such as audio playing in the vehicle, noise and/or talking, such as noise and talking of the passengers. In addition, other factors which are inferential of possible distraction, such as the presence, number and profile information of the one or more passengers, can also be used when determining the existing level of cognitive demand.

Brain activity can be sensed indirectly by, for example, one or more biometric sensors, such as, for example, heart rate, temperature, and/or galvanic skin response sensors. More directly, brain activity could also be sensed using techniques such as electroencephalogram (EEG), EEG based brain-computer interfaces, and/or functional near-infrared spectroscopy (fNIRS).

The gathered data includes, but is not limited to, a traffic condition, a road condition and/or a weather condition. As noted above, external services can be accessed or a GPS device can be used to detect traffic, poor roads, and weather on a given route at a particular time. For example, given a vehicle's speed and direction on a particular route, the system may determine a traffic condition, a road condition and/or a weather condition over an approaching period of time. Social applications may also be used. For example, WAZE®, from Google, Inc. of Mountain View, Calif., reports bridge closures, parades, traffic accidents, and other conditions. The inputted data includes, but is not limited to profile data of the vehicle operator, profile data of the one or more passengers, a make of the vehicle, a model of the vehicle, and a typical number of passengers in the vehicle at a given time. The inputted data can be entered by a user, such as the vehicle operator, or be provided by a third party, such as, for example, an insurance company and/or a vehicle dealer or manufacturer.

FIG. 2 is a chart illustrating operator and passenger data which may be used in connection with determining the acceptable and existing levels of cognitive demand on a vehicle operator, in accordance with an embodiment of the present invention. Referring to FIG. 2, operators and passenger(s) may correspond to a user ID, and the data may include, for example, role (e.g., operator or passenger), gender, years of operating experience, and an age classification (e.g., teen, adult, toddler, etc.). The operator and passenger data can be used to determine a level of risk. For example, a higher number of passengers, or multiple teenage passengers may lead to a conclusion of higher risk than less passengers and adults instead of teenagers in the vehicle.

FIG. 3 is a chart illustrating different types of operating conditions that may contribute to a determination of the acceptable and existing levels of cognitive demand on a vehicle operator, in accordance with an embodiment of the present invention. Referring to FIG. 3, the operating conditions refer to those of a land vehicle, and can include road conditions (e.g., normal, rough), weather conditions (e.g., dry, sunny, rainy, snowy, icy), and traffic conditions (e.g., light, moderate, heavy). Rough road conditions can be due to, for example, potholes and/or construction. Factors, such as, for example, the number of traffic incidents can also be used to determine the difficulty of navigating a road. Operating conditions may vary based on the type of vehicle. For example, data in connection with an air vehicle, such as an airplane or helicopter, may include route conditions, such as turbulent or smooth, and additional weather conditions more relevant to air travel, such as wind speed and lightning. Data in connection with a sea vehicle, such as a boat, may include water conditions, such as calm or rough, and wave height.

FIG. 4 is a chart illustrating vehicle data which may be used in connection with determining the acceptable and existing levels of cognitive demand on a vehicle operator, in accordance with an embodiment of the present invention. Referring to FIG. 4, a vehicle may correspond to a VehicleID, and the data may include, for example, make and model, location and aspects of the vehicle that can produce cognitive load for the operator, such as vehicle sound system volume. The VehicleID can be, for example, a vehicle identification number (VIN) or any other unique identifier. The Location can be the current GPS coordinates of the vehicle. The sound system volume can be portrayed on, for example, a numerical scale, with higher values indicating higher volume.

According to an embodiment, a determination of an existing level of cognitive demand on the vehicle operator in an operating environment can be based, at least in part, on vehicle-to-vehicle communication. For example, data on the cognitive load of other operators in different vehicles in the same or a nearby area (e.g., within a certain radius at a given time) can be received and used to determine an existing level of cognitive demand on a vehicle operator.

The process 100 further includes, at block 107, determining whether the existing level of cognitive demand is greater than the acceptable level of cognitive demand. If yes at block 107, the method proceeds to block 109, where a stimulus directed to the one or more passengers is generated in order to reduce the existing level of cognitive demand on the vehicle operator. If no at block 107, no stimulus is generated, and the method returns to block 103 to continue to monitor the operating environment for modifications that may result in any changes to acceptable and existing levels of cognitive demand on the vehicle operator.

Generating the stimulus can include, but is not limited to, electronically generating an audio stimulus, electronically generating a visual stimulus and/or electronically generating a physical stimulus. Non-limiting examples of stimuli include (i) playing a recording commanding quiet and/or saying the name of the passenger, (ii) vibrating a seat and/or cell phone of a passenger, (iii) displaying a visual distraction, such as, for example, personal images or a video, (iv) making a passenger(s) aware of the operator's situation (e.g., display upcoming traffic, weather forecast, or summarize the situation into a statement that is played for the passenger(s)), and (v) offering an interactive game for the passenger(s).

According to an embodiment, in order to generate the stimulus, a number and/or a configuration of the one more passengers in the vehicle, an amount of the existing level of cognitive demand attributable to one or more activities of the one or more passengers, and the stimulus sufficient to reduce the existing level of cognitive demand on the vehicle operator to at least the acceptable level of cognitive demand are each determined. The level of cognitive demand attributable to one or more activities of the one or more passengers can be a prediction based on, for example, a noise level, talking and/or movement of the passengers, historical data regarding previous trips with the passengers and/or information about the passengers, such as, for example, a number of the passengers, their age and/or their gender. A number and/or a configuration of the one more passengers in the vehicle can be determined by, for example, detecting weight on the seats, operator input (e.g., on a dashboard computer), and/or facial recognition by, for example, a camera.

Generating the stimulus can also comprise determining a stimulus type and/or length based on profile data a passenger (e.g., age, gender, and/or educational level) so that the passenger is interested in the stimulus. For example, if the passenger is a toddler, the stimulus can be, for example, an activity or video geared to children 2 to 4 years old, or if the passenger is a teenager, the stimulus can be, for example, an activity or video geared to children and young adults 13 to 19 years old. In connection with determining a stimulus type and/or length, a system may also store passenger program preferences in accordance with an embodiment of the present invention. Referring to FIG. 5, which is a chart illustrating passenger program preferences, in accordance with an embodiment of the present invention, passenger(s) may correspond to a passengerID, and the data may include, for example, a preferred music genre (e.g., rock, country, jazz, pop, etc.), a preferred video genre (e.g., documentary, western, comedy, drama, etc.), and a preferred game genre (e.g., shooting, adventure, fighting, racing, etc.).

FIG. 6 is a chart illustrating details of different types of stimuli, in accordance with an embodiment of the present invention. Referring to FIG. 6, different stimuli can correspond to respective ProgramIDs, and correspond to details such as function (e.g., get a passenger's attention or engage the passenger over a period of time), type of stimulus (e.g., audio, such as music, video, such as a movie, and physical, such as a vibration), genre depending on type of stimulus (e.g., rock for music, mystery for video, and Morse code for vibration), length of the stimulus, the file containing the stimulus, the target audience for the stimulus (e.g., teen, male, female, any), and a cognitive load rating indicating a level of cognitive demand the stimulus will require for a passenger. The cognitive load rating can be, for example, a value in a given range or scale (e.g., a numerical value) indicating lower to higher required levels of cognitive demand on a passenger. The chart or some form thereof can be stored in an accessible database, which can be accessed when determining an appropriate stimulus to lower the operator's existing level of cognitive demand in connection with a given audience in a given situation.

In an embodiment where there is vehicle-to-vehicle communication, stimuli can be generated to distract passengers in multiple vehicles that may be in close proximity to each other (e.g., within a given radius during a given time interval) and that are experiencing similar increases in cognitive demand due to, for example, similar operating conditions.

An embodiment of the present invention also includes informing a vehicle operator that is alone of an increased level of cognitive demand so that the vehicle operator can proceed more carefully.

FIG. 7 is a block diagram of a system for reducing cognitive demand on a vehicle operator, according to an exemplary embodiment of the present invention. As shown in FIG. 7 by lines and/or arrows, the components of the system 700 are operatively coupled to each other via, for example, physical connections, such as wired and/or direct electrical contact connections, and wireless connections, such as, for example, WiFi, BLUETOOTH®, IEEE 802.11, and/or networks, including but not limited to, a local area network (LAN), wide area network (WAN), cellular network, satellite network or the Internet.

Referring to FIG. 7, the system 700 includes a vehicle 701 having an operator 703, and one or more passengers 705 therein. The vehicle 701 includes one or more sensors 702a, 702b, 702c, etc., executed via at least one processor, which are capable of detecting the one or more passengers 705 in addition to the vehicle operator 703. The system 700 further includes an engagement component 710, which, in accordance with an embodiment, can be the engagement device discussed herein. The engagement component 710 is executed via at least one processor and is operatively coupled to the one or more sensors 702a, 702b, 702c.

Figure 8:
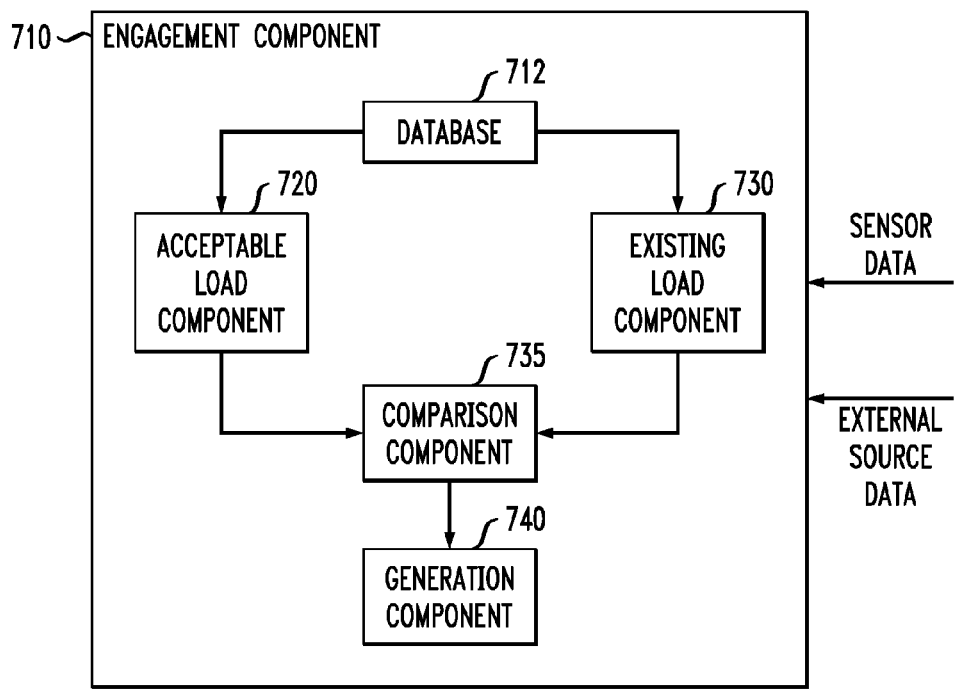
FIG. 8, which is a block diagram of the engagement component 710, according to an exemplary embodiment of the present invention.

Referring to FIG. 8, which is a block diagram of the engagement component 710, according to an embodiment of the present invention, the engagement component 710 includes an acceptable load component 720 capable of determining an acceptable level of cognitive demand on the vehicle operator corresponding to an operating environment, and an existing load component 730 capable of determining an existing level of cognitive demand on a vehicle operator in an operating environment. The one or more sensors 702a, 702b, 702c are capable of sensing one or more characteristics of or in the vehicle (e.g., speed, direction and pressure sensors, microphones, cameras, decibel meter), and the existing load component 730 can compute the existing level of cognitive demand based on the sensed characteristics. The engagement component 710 further includes a comparison component 735 capable of determining whether the existing level of cognitive demand is greater than the acceptable level of cognitive demand, and a generation component 740 capable of generating a stimulus directed to the one or more passengers in order to reduce the existing level of cognitive demand on the vehicle operator, if the existing level of cognitive demand is greater than the acceptable level of cognitive demand. The generation component 740 can, for example, electronically generate an audio stimulus, a visual stimulus and/or a physical stimulus.

According to an embodiment, the engagement component 710 includes, for example, a database 712 of inputted information, such as, for example, passenger and operator profiles including, for example, age and gender, vehicle information, such as make and model, and/or a typical number of passengers in the vehicle at a given time. The engagement component 710 can also access, for example, external services 760 and/or third party information 770 via network 750 to obtain data, such as, for example, a traffic condition, a road condition, a weather condition, third party (e.g., insurance) profile data of the vehicle operator, third party profile data (e.g., social media) of the one or more passengers, third party data on a make and/or model of the vehicle, a model of the vehicle, and/or a typical number of passengers in the vehicle at a given time.

The acceptable and existing load components 720, 730 compute the acceptable and existing levels of cognitive demand based on the data from the database 712, the sensor data, and/or the data from external sources.

For example, when determining current operating conditions, data from a mapping service may be used, which takes a vehicle's location and speed and determines the conditions (e.g., traffic) along a route ahead. The estimate can be based, for example, on the next N minutes of travel. N could be set to 5 minutes, for example.

A make and model of a vehicle can also influence levels of cognitive demand, as some vehicles can be more difficult to drive, and therefore require more concentration, than other vehicles. In addition certain types of vehicles may be better equipped to handle certain road, traffic or weather conditions than other types of vehicles. For example, a sport utility vehicle (SUV) with four wheel drive may be easier to handle in snowy or icy conditions than a rear wheel drive sedan.

Traffic, road and weather conditions can also be detected using sensors 702a, 702b, 702c, etc. (e.g., temperature, motion or moisture sensors). Data from sensors can be combined with predictions from a mapping service regarding the traffic, road and weather conditions.

In accordance with an embodiment of the present invention, cabin distractions, such as a radio playing, talking and/or movement, can be calculated as a function of the number and type of passengers in a vehicle. For example, according an embodiment, a weighted multiplier for each of a child (e.g., 2), teen (e.g., 5), and adult (e.g., 1) can be used. So, by way of example, if there are 3 passengers, such as a 5 year old child, a 13 year old teen, and 55 year old adult, then the cabin distractions would be a function of 2+5+1=8. According to an embodiment, cabin distractions can also be calculated as a function of gender.

The generation component 740, for example, determines, based on input from the one or more sensors 702a, 702b, 702c, a number and/or a configuration of the one more passengers 705 in the vehicle 701, determines, based on the input from the one or more sensors 702a, 702b, 702c, an amount of the existing level of cognitive demand attributable to one or more activities of the one or more passengers 705, and determines a stimulus sufficient to reduce the existing level of cognitive demand on the vehicle operator to at least the acceptable level of cognitive demand.

The existing load component 730 uses vehicle data, for example, where the vehicle is located and a speed of the vehicle, and operating environment data to determine conditions over a time period (e.g., in the next N minutes at a particular speed from a given location, the traffic is heavy), in order to determine an existing level of cognitive demand on a vehicle operator in an operating environment.

An operator's years of experience and age can be used by the acceptable load component 720 to determine what level of cognitive demand an operator can handle. If the existing level of cognitive demand is greater than the acceptable level of cognitive demand, the generation component 740 uses, for example, games, videos, music, reading, and/or other methods to grab the attention of and/or engage the passengers 705, thus creating a cognitive load of the passengers, which reduces the cognitive load on the vehicle operator attributable to the passengers so that the operator 703 can concentrate on operating the vehicle 701.

Figure 9:
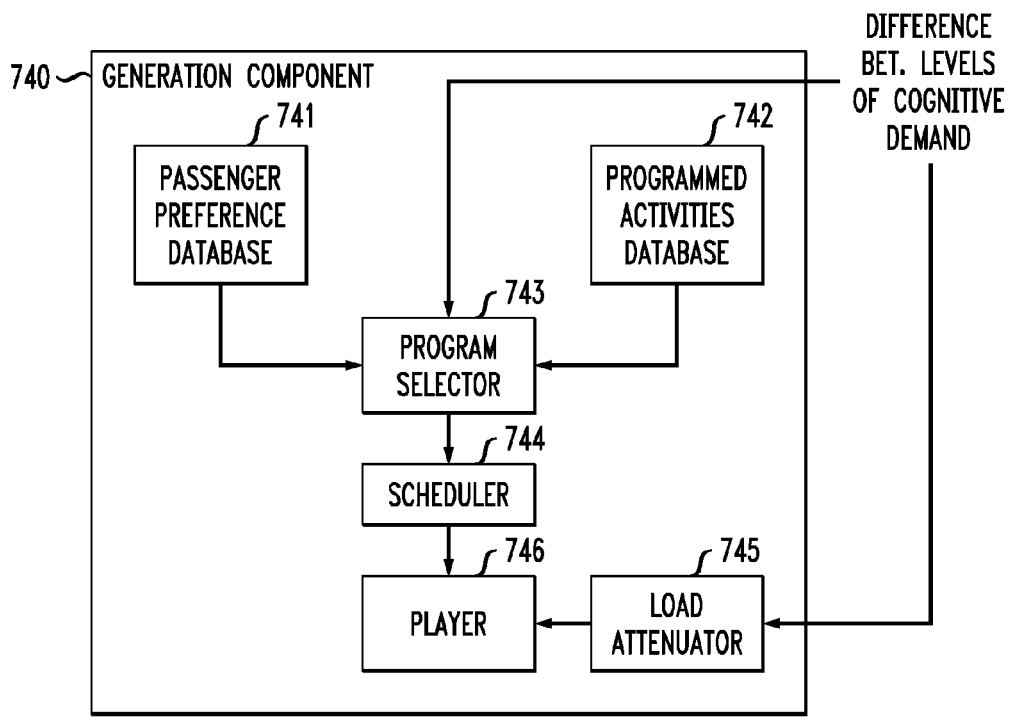
FIG. 9 is a block diagram of a generation component, according to an exemplary embodiment of the invention.

Referring to FIG. 9, which is a block diagram of a generation component in accordance with an embodiment of the present invention, stimuli, which can grab passenger attention (e.g., playing an audio clip of a person's name) or occupy a passenger's attention (e.g., photos, videos, songs, stories, interactive games and/or quizzes) are stored in a programmed activities database 742. Passenger preferences for certain types of stimuli are stored in a passenger preference database 741.

The program selector 743 uses the passenger preferences for certain types of stimuli from the passenger preference database 741, and selects stimuli from the programmed activities database 742 for creating a cognitive load of the passengers, which reduces the cognitive load on the vehicle operator. The selection of a stimulus can also be based on the amount of difference between the existing level of cognitive demand and the acceptable level of cognitive demand, so that a greater difference results in a stimulus that engages the one or more passengers for a longer period of time, as opposed to grabbing the attention of the one or more passengers for a shorter period of time.

In accordance with an embodiment, the program selector 743 adds the stimulus to a queue, and a scheduler 744 determines the selections from the queue to be played, and sends the selections to a player 746, for example, a music player. The amount of difference between the existing level of cognitive demand and the acceptable level of cognitive demand can change over time. Based on the amount of difference between the existing level of cognitive demand and the acceptable level of cognitive demand, a cognitive load attenuator 745 can then change player controls to increase or decrease a cognitive load on passengers. For example, the cognitive load attenuator 745 might add load by increasing the volume of a selection being played, or by making a game's difficulty increase. Controls of a player 746 can be reset to default values, for example, at the conclusion of a trip and/or when the vehicle starts or an engagement component 710 is turned on.

A program can also be selected based on its length as it corresponds to a known length of a trip. For example, a selection that lasts no more than an hour can be used for a trip that is 60 minutes or less.

The program selector 743 may continue to select stimuli according to passenger preferences until the difference between the existing level of cognitive demand and the acceptable level of cognitive demand is zero. If a program selector 743 is unable to satisfy every passenger preference, the program selector 743 will attempt to satisfy a majority of passenger preferences.

In accordance with an embodiment of the present invention, an engagement component 710 can be installed in a passenger compartment of a vehicle and equipped with a microphone, audio and video players and a speaker facing toward passengers. As one the stimuli, a vehicle operator can record an audio message to distract passengers (e.g., in the driver's voice or by another person) using the microphone.

The engagement component 710 can be operatively coupled to a GPS component 704 and a computing component 706 for performing any required computations, such as computing levels of cognitive demand. The computing component 706 can be integrated into, for example, the engagement component 710, or be separate from the engagement component. The computing component 706 can also include a vehicle computer. The engagement component 710 can include or be operatively coupled to a display capable of displaying images and/or video. The display can be, for example, a tablet device.

Components of the system 701, such as, for example, the engagement component and the GPS component 704 are connected to a network 750 to access, for example, external services 760 and third party information 770 to obtain data, such as, for example, a traffic condition, a road condition, a weather condition, and third party data as described herein. The network 750 can also provide communication with other vehicles 780 as described herein. The network 750 may include, but is not limited to, a LAN, WAN, cellular network, satellite network or the Internet. By way of example, sensors 702a, 702b and 702c are operatively coupled to the engagement component 710 and can be, for example, under each seat in the vehicle to sense passenger weight and/or movement.

In operation, by way of example, the GPS component 704 can update the GPS location of the vehicle 701 at predetermined intervals, for example, every second, and the engagement component 710 can query an external service 760 with the GPS location to get conditions ahead for a given interval of travel (e.g., the next 5 minutes). This updating and querying can be continuously repeated throughout a trip.

According to an embodiment, stimuli can be specific to each passenger, such as, for example, a message on a mobile device (e.g. mobile phone), a vibrating seat, a game, music and/or video on a mobile device. If a passenger does not respond to a stimulus, different stimuli can be tried until the engagement component 710 determines that there has been a required reduction in an existing level of cognitive demand. If the engagement component 710 has previously determined that more than one strategy works to engage and/or grab the attention of a specific passenger, then the system can pick randomly among appropriate selections each time generation of a stimulus for a passenger is required. If no stimuli are working to reduce cognitive load, then the engagement component 710 can relay a direct message to a vehicle operator that the vehicle operator must drive carefully and to passengers that the vehicle operator is facing difficult operating conditions, and should not be distracted. Known methods may be used to learn which categories and/or genres are of highest interest to passengers.

In accordance with embodiments of the present invention, the engagement component 710 could include, for example, an ambient display, such as those in a taxi for passengers, a TV, and/or a radio with a display.

Non-limiting examples of stimuli generating relatively lower levels of cognitive load on a passenger can include nothing visual, only music, a static image, and/or a soothing sound (e.g., water flowing). Non-limiting examples of stimuli generating relatively higher levels of cognitive load on a passenger can include stimuli with high interactivity (e.g., a game), stimuli with large amounts of visual content, a news program, video highlights, items tagged with particular terms (e.g., terrorism, war, explosion, etc.), items with a sudden onset (e.g., a flash, loud sound), pleasant individual memories included in photos or videos belonging the passengers.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
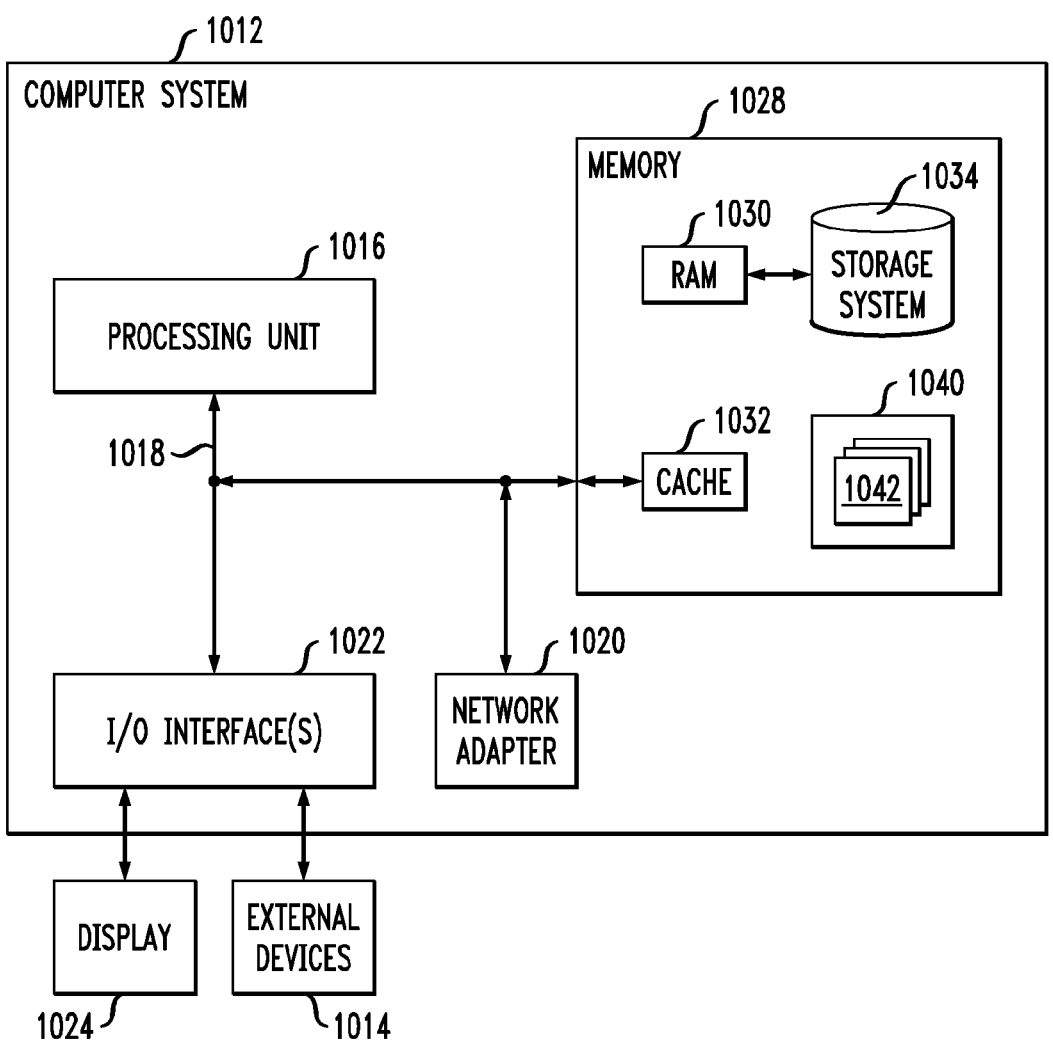
FIG. 10 illustrates a computer system in accordance with which one or more components/steps of the techniques of the invention may be implemented, according to an exemplary embodiment of the invention.

One or more embodiments can make use of software running on a general-purpose computer or workstation. With reference to FIG. 10, in a computing node 1010 there is a computer system/server 1012, which is operational with numerous other general purpose or special purpose computing system environments or configurations. Examples of well-known computing systems, environments, and/or configurations that may be suitable for use with computer system/server 1012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1012 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 1012 in computing node 1010 is shown in the form of a general-purpose computing device. The components of computer system/server 1012 may include, but are not limited to, one or more processors or processing units 1016, a system memory 1028, and a bus 1018 that couples various system components including system memory 1028 to processor 1016.

The bus 1018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 1012 typically includes a variety of computer system readable media. Such media may be any available media that is accessible by computer system/server 1012, and it includes both volatile and non-volatile media, removable and non-removable media.

The system memory 1028 can include computer system readable media in the form of volatile memory, such as random access memory (RAM) 1030 and/or cache memory 1032. The computer system/server 1012 may further include other removable/non-removable, volatile/nonvolatile computer system storage media. By way of example only, storage system 1034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1018 by one or more data media interfaces. As depicted and described herein, the memory 1028 may include at least one program product having a set (e.g., at least one) of program modules that are configured to carry out the functions of embodiments of the invention. A program/utility 1040, having a set (at least one) of program modules 1042, may be stored in memory 1028 by way of example, and not limitation, as well as an operating system, one or more application programs, other program modules, and program data. Each of the operating system, one or more application programs, other program modules, and program data or some combination thereof, may include an implementation of a networking environment. Program modules 1042 generally carry out the functions and/or methodologies of embodiments of the invention as described herein.

Computer system/server 1012 may also communicate with one or more external devices 1014 such as a keyboard, a pointing device, a display 1024, etc., one or more devices that enable a user to interact with computer system/server 1012, and/or any devices (e.g., network card, modem, etc.) that enable computer system/server 1012 to communicate with one or more other computing devices. Such communication can occur via Input/Output (I/O) interfaces 1022. Still yet, computer system/server 1012 can communicate with one or more networks such as a local area network (LAN), a general wide area network (WAN), and/or a public network (e.g., the Internet) via network adapter 1020. As depicted, network adapter 1020 communicates with the other components of computer system/server 1012 via bus 1018. It should be understood that although not shown, other hardware and/or software components could be used in conjunction with computer system/server 1012. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for reducing cognitive demand on a vehicle operator, comprising:
   detecting one or more passengers in a vehicle in addition to the vehicle operator;
   determining a threshold level of cognitive demand on the vehicle operator corresponding to an operating environment;
   determining an existing level of cognitive demand on the vehicle operator in the operating environment, wherein the existing level of cognitive demand is attributable at least in part to an activity of the one or more passengers;
   determining whether the existing level of cognitive demand is greater than the threshold level of cognitive demand; and
   wherein, if the existing level of cognitive demand is greater than the threshold level of cognitive demand, generating a stimulus comprising at least one of a video presentation and an audio presentation directed to the one or more passengers in order to hold the attention of the one or more passengers, so as to prevent the one or more passengers from distracting the vehicle operator and to reduce the existing level of cognitive demand on the vehicle operator attributed to the one or more passengers;
   wherein the detecting, determining and generating steps are performed by a computer system comprising a memory and at least one processor coupled to the memory.

2. The method according to claim 1, wherein generating the stimulus comprises at least one of electronically generating an audio stimulus, electronically generating a visual stimulus and electronically generating a physical stimulus.

3. The method according to claim 1, wherein determining the existing level of cognitive demand on the vehicle operator comprises sensing a characteristic of or in the vehicle and computing the existing level of cognitive demand based on the sensed characteristic.

4. The method according to claim 3, wherein the sensed characteristic includes at least one of a speed of the vehicle, a direction of the vehicle, a location of the vehicle, a number of the one or more passengers in the vehicle, a volume level of audio playing in the vehicle, and the activity of the one or more passengers in the vehicle.

5. The method according to claim 1, wherein determining the existing level of cognitive demand on the vehicle operator comprises gathering data using one or more sources external to the vehicle and computing the existing level of cognitive demand based on the gathered data.

6. The method according to claim 5, wherein the gathered data includes at least one of a traffic condition, a road condition or a weather condition.

7. The method according to claim 1, wherein determining the existing level of cognitive demand on the vehicle operator comprises computing the existing level of cognitive demand based on inputted data.

8. The method according to claim 7, wherein the inputted data includes at least one of profile data of the vehicle operator, profile data of the one or more passengers, a make of the vehicle, a model of the vehicle, and a typical number of passengers in the vehicle at a given time.

9. The method according to claim 1, wherein determining the threshold level of cognitive demand on the vehicle operator comprises computing the threshold level of cognitive demand based on at least one of profile data of the vehicle operator, and a condition of the operating environment.

10. The method according to claim 9, wherein the profile data of the vehicle operator comprises at least one of an age, a gender, historical operating data, and a number of years of operating experience of the vehicle operator.

11. The method according to claim 9, wherein condition of the operating environment comprises at least one of a traffic condition, a road condition or a weather condition.

12. The method according to claim 1, wherein determining an existing level of cognitive demand on the vehicle operator comprises measuring a brain activity level of the vehicle operator, and converting the measured brain activity level into the existing level of cognitive demand on the vehicle operator.

13. The method according to claim 1, wherein generating the stimulus directed to the one or more passengers comprises:
    determining at least one of a number and a configuration of the one more passengers in the vehicle;
    determining an amount of the existing level of cognitive demand attributable to the activity of the one or more passengers; and
    determining the stimulus sufficient to reduce the existing level of cognitive demand on the vehicle operator to at least the threshold level of cognitive demand.

14. The method according to claim 1, wherein generating the stimulus directed to the one or more passengers comprises determining a stimulus type based on profile data of the one or more passengers.

15. A system for reducing cognitive demand on a vehicle operator, comprising:
    a memory and at least one processor coupled to the memory;
    one or more sensors, executed via the at least one processor, configured for detecting one or more passengers in a vehicle in addition to the vehicle operator; and
    an engagement component, executed via the at least one processor and operatively coupled to the one or more sensors, wherein the engagement component is configured for:
    determining an a threshold level of cognitive demand on the vehicle operator corresponding to an operating environment;
    determining an existing level of cognitive demand on the vehicle operator in the operating environment, wherein the existing level of cognitive demand is attributable at least in part to an activity of the one or more passengers;
    determining whether the existing level of cognitive demand is greater than the threshold level of cognitive demand; and
    generating a stimulus comprising at least one of a video and an audio presentation directed to the one or more passengers in order to hold the attention of the one or more passengers, so as to prevent the one or more passengers from distracting the vehicle operator and to reduce the existing level of cognitive demand on the vehicle operator attributed to the one or more passengers, if the existing level of cognitive demand is greater than the threshold level of cognitive demand.

16. The system according to claim 15, wherein the engagement component at least one of electronically generates an audio stimulus, electronically generates a visual stimulus and electronically generates a physical stimulus.

17. The system according to claim 15, wherein:
    the one or more sensors are configured for sensing a characteristic of or in the vehicle; and
    the engagement component is configured for computing the existing level of cognitive demand based on the sensed characteristic.

18. The system according to claim 15, wherein the engagement component is configured for:
    gathering data using one or more sources external to the vehicle; and
    computing the existing level of cognitive demand based on the gathered data.

19. The system according to claim 15, wherein the engagement component is configured for:
    determining, based on input from the one or more sensors, at least one of a number and a configuration of the one more passengers in the vehicle;
    determining, based on the input from the one or more sensors, an amount of the existing level of cognitive demand attributable to the activity of the one or more passengers; and
    determining the stimulus sufficient to reduce the existing level of cognitive demand on the vehicle operator to at least the threshold level of cognitive demand.

20. A computer program product for reducing cognitive demand on a vehicle operator, the computer program product comprising a computer readable storage medium having program instructions embodied therewith, the program instructions executable by a processor to cause the processor to perform a method comprising:
    detecting one or more passengers in a vehicle in addition to the vehicle operator;
    determining an a threshold level of cognitive demand on the vehicle operator corresponding to an operating environment;
    determining an existing level of cognitive demand on the vehicle operator in the operating environment, wherein the existing level of cognitive demand is attributable at least in part to an activity of the one or more passengers;
    determining whether the existing level of cognitive demand is greater than the threshold level of cognitive demand; and
    wherein, if the existing level of cognitive demand is greater than the threshold level of cognitive demand, generating a stimulus comprising at least one of a video and an audio presentation directed to the one or more passengers in order to hold the attention of the one or more passengers, so as to prevent the one or more passengers from distracting the vehicle operator and to reduce the existing level of cognitive demand on the vehicle operator attributed to the one or more passengers.

* * * * *